(12) United States Patent
Reinhardt

(10) Patent No.: US 11,814,857 B2
(45) Date of Patent: Nov. 14, 2023

(54) SAND ANCHOR UTILIZING COMPRESSED GAS

(71) Applicant: Jarred Reinhardt, Austin, TX (US)

(72) Inventor: Jarred Reinhardt, Austin, TX (US)

( * ) Notice: Subject to any disclaimer, the term of this patent is extended or adjusted under 35 U.S.C. 154(b) by 0 days.

(21) Appl. No.: 17/666,284

(22) Filed: Feb. 7, 2022

(65) Prior Publication Data

US 2022/0251865 A1 Aug. 11, 2022

Related U.S. Application Data

(60) Provisional application No. 63/146,446, filed on Feb. 5, 2021.

(51) Int. Cl.
| | | |
|---|---|---|
| *E04H 12/22* | (2006.01) | |
| *A45F 3/44* | (2006.01) | |
| *A01K 97/10* | (2006.01) | |
| *F04B 9/14* | (2006.01) | |

(52) U.S. Cl.
CPC .......... *E04H 12/2215* (2013.01); *A45F 3/44* (2013.01); *E04H 12/2269* (2013.01); *A01K 97/10* (2013.01); *F04B 9/14* (2013.01)

(58) Field of Classification Search
CPC . E04H 12/2215; E04H 15/62; E04H 12/2269; E04H 12/2223; E04H 12/2246; E04H 17/263; A01K 97/10; A45F 3/44; E21B 7/18; F04B 33/00; F04B 9/14; F04B 47/00; F16K 27/0209
USPC ........................................................ 248/530
See application file for complete search history.

(56) References Cited

U.S. PATENT DOCUMENTS

| | | | | |
|---|---|---|---|---|
| 595,306 | A * | 12/1897 | Jackson | E21B 27/00 166/107 |
| 717,252 | A * | 12/1902 | McRoberts | E21B 27/00 48/57 |
| 1,520,803 | A * | 12/1924 | Charles | E21B 27/00 166/107 |
| 2,026,058 | A * | 12/1935 | Perry | F04B 53/126 137/533.15 |
| 2,215,710 | A * | 9/1940 | Miller | F04B 53/1037 175/242 |
| 2,234,977 | A * | 3/1941 | Ohland | E21B 27/005 417/430 |
| 2,449,720 | A * | 9/1948 | Santiago | E21B 27/00 166/163 |
| 2,548,038 | A * | 4/1951 | Moliskey | A01K 97/10 43/18.1 R |
| 3,224,378 | A * | 12/1965 | Graham | F16J 15/164 92/182 |
| 3,225,734 | A * | 12/1965 | Bule | E04H 12/32 116/63 P |

(Continued)

FOREIGN PATENT DOCUMENTS

| | | | | |
|---|---|---|---|---|
| DE | 202004017297 | U1 * | 3/2005 | ............ A45B 23/00 |
| FR | 2545529 | A1 * | 11/1984 | ............ F24T 10/20 |
| KR | 20220002383 | U * | 10/2022 | ............ A01K 97/10 |

*Primary Examiner* — Taylor Morris

(57) ABSTRACT

A sand anchor includes a shank and a plunger. The plunger can be inserted into a first end of the shank. The plunger includes an extension, an annular fitting, and an interior seal. The extension is formed with a hollow center. The annular fitting is positioned between an outer surface of the extension and an inner surface of the shank. The interior seal is positioned within the hollow center of the extension and configured to provide a one-way seal.

16 Claims, 4 Drawing Sheets

(56) References Cited

U.S. PATENT DOCUMENTS

| | | | | |
|---|---|---|---|---|
| 3,273,930 A * | 9/1966 | Gottfried | A01C 5/02 | 175/405 |
| 3,318,560 A * | 5/1967 | Garrette, Jr. | E04H 12/182 | 52/165 |
| 3,585,738 A * | 6/1971 | De Koning | E02F 3/9243 | 175/6 |
| 3,602,471 A * | 8/1971 | Reed, III | B64D 1/02 | 248/156 |
| 3,684,410 A * | 8/1972 | Fitzgerald | F04B 53/162 | 417/554 |
| 3,858,833 A * | 1/1975 | Fink | A01K 97/10 | 248/533 |
| 4,447,847 A * | 5/1984 | Drulard | H02G 13/00 | 361/117 |
| 4,597,511 A * | 7/1986 | Licari | F04B 53/1072 | 137/454.6 |
| 4,653,791 A * | 3/1987 | Catcher | A01K 80/00 | 294/50.5 |
| 4,767,290 A * | 8/1988 | Jones | F04B 9/14 | 92/162 R |
| 4,921,407 A * | 5/1990 | Ponder | E21B 23/006 | 417/553 |
| 5,297,579 A * | 3/1994 | McConnell | F16K 15/04 | 137/515.7 |
| 5,457,918 A * | 10/1995 | Plourde | E04H 12/2223 | 52/165 |
| 5,593,289 A * | 1/1997 | Tarpley | F04B 53/005 | 417/454 |
| 5,727,639 A * | 3/1998 | Jeter | B25D 9/04 | 173/132 |
| H1780 H * | 2/1999 | Melega | | 175/58 |
| 5,975,635 A * | 11/1999 | Parpala | A47C 9/10 | 297/338 |
| 6,027,319 A * | 2/2000 | Winefordner | F04B 33/005 | 417/440 |
| 6,050,352 A * | 4/2000 | Thompson | E21B 10/60 | 175/69 |
| 6,098,724 A * | 8/2000 | Ricker | G01N 1/08 | 175/58 |
| 6,260,314 B1 * | 7/2001 | Church | E04H 12/223 | 52/170 |
| 6,325,601 B2 * | 12/2001 | Wu | F04B 33/005 | 417/469 |
| 6,371,741 B1 * | 4/2002 | Wu | F04B 19/02 | 417/446 |
| 6,428,290 B1 * | 8/2002 | Wang | F04B 33/005 | 417/521 |
| 6,481,364 B2 * | 11/2002 | Woyjeck | A01K 1/04 | 114/294 |
| 6,516,897 B2 * | 2/2003 | Thompson | E04H 12/34 | 175/93 |
| 6,755,628 B1 * | 6/2004 | Howell | E21B 43/127 | 417/459 |
| 7,121,356 B2 * | 10/2006 | Michael | A01B 1/165 | 175/252 |
| 7,150,579 B2 * | 12/2006 | Newton | E01F 9/685 | 403/372 |
| 7,246,783 B2 * | 7/2007 | Harold | A45F 3/44 | 248/156 |
| 7,353,746 B2 * | 4/2008 | Kutella | F04B 3/003 | 92/61 |
| 7,392,612 B2 * | 7/2008 | Winkler | A01K 97/06 | 297/188.21 |
| 7,726,913 B1 * | 6/2010 | Sjogren | E02D 5/385 | 166/334.4 |
| 8,147,224 B2 * | 4/2012 | Tsai | F04B 53/126 | 417/521 |
| 8,191,306 B2 * | 6/2012 | Wessel | A47G 7/06 | 47/58.1 CF |
| 8,307,892 B2 * | 11/2012 | Frazier | E21B 34/14 | 166/135 |
| 8,444,105 B2 * | 5/2013 | Silvestri | E04H 12/2215 | 52/153 |
| 9,163,477 B2 * | 10/2015 | Frazier | E21B 34/063 | |
| 9,629,427 B2 * | 4/2017 | Alm | A45B 25/00 | |
| 9,803,388 B2 * | 10/2017 | Cunningham | E04H 17/263 | |
| 9,809,992 B1 * | 11/2017 | Barlow | E04H 12/00 | |
| 9,834,906 B1 * | 12/2017 | Linares | A45B 23/00 | |
| 10,329,787 B2 * | 6/2019 | Laffy | E04H 12/2215 | |
| 10,422,102 B1 * | 9/2019 | Fontaine | E02D 35/005 | |
| 10,557,280 B2 * | 2/2020 | Washko | E04H 12/2246 | |
| 10,718,322 B1 * | 7/2020 | Rogish | F04B 53/1037 | |
| 10,895,090 B2 * | 1/2021 | Worm | E04H 12/2223 | |
| 11,280,104 B2 * | 3/2022 | Gonzalez | E04H 12/2246 | |
| 2002/0027182 A1 * | 3/2002 | Eppley | A63B 71/023 | 248/156 |
| 2006/0101877 A1 * | 5/2006 | Orum | F16B 35/04 | 70/231 |
| 2006/0241647 A1 * | 10/2006 | Chen | E04H 17/263 | 606/100 |
| 2012/0267131 A1 * | 10/2012 | de Oliveira | E04H 12/2215 | 172/381 |
| 2016/0333603 A1 * | 11/2016 | Knudsen | E04H 12/2215 | |
| 2017/0347533 A1 * | 12/2017 | Volin | A01G 27/005 | |
| 2018/0371784 A1 * | 12/2018 | Gonzalez | E04H 12/2246 | |

* cited by examiner

SAND ANCHOR UTILIZING COMPRESSED GAS

CROSS-REFERENCE TO RELATED APPLICATION(S) AND CLAIM OF PRIORITY

This application claims priority under 35 U.S.C. § 119(e) to U.S. Provisional Patent Application No. 63/146,446 filed on Feb. 5, 2021. The above-identified provisional patent application is hereby incorporated by reference in its entirety.

TECHNICAL FIELD

This application relates generally to anchor optimization and, more specifically, to a sand anchor utilizing compressed gas.

BACKGROUND

While on a beach, a person fishing may have a need to use multiple fishing rods to catch a greater number of fish. Burying a fishing rod in the sand would require digging a hole for the rod and then filling in the hole. This method has faults related to a balancing of removing the rod from the sand when a fish is hooked versus resisting being removed by the fish and losing the rod.

SUMMARY

This disclosure provides a sand anchor utilizing compressed gas.

In a first embodiment, a sand anchor includes a shank and a plunger. The plunger can be inserted into a first end of the shank. The plunger includes an extension, an annular fitting, and an interior seal. The extension is formed with a hollow center. The annular fitting is positioned between an outer surface of the extension and an inner surface of the shank. The interior seal is positioned within the hollow center of the extension and configured to provide a one-way seal.

In a second embodiment, a sand anchor includes a shank and a plunger. The plunger can be inserted into a first end of the shank. The plunger includes an extension, an annular fitting, an interior seal and a cap. The extension is formed with a hollow center. The annular fitting is positioned between an outer surface of the extension and an inner surface of the shank. The interior seal is positioned within the hollow center of the extension and configured to provide a one-way seal. The cap is positioned on an end the extension opposite to an end of the extension inserted into the shank.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 4, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
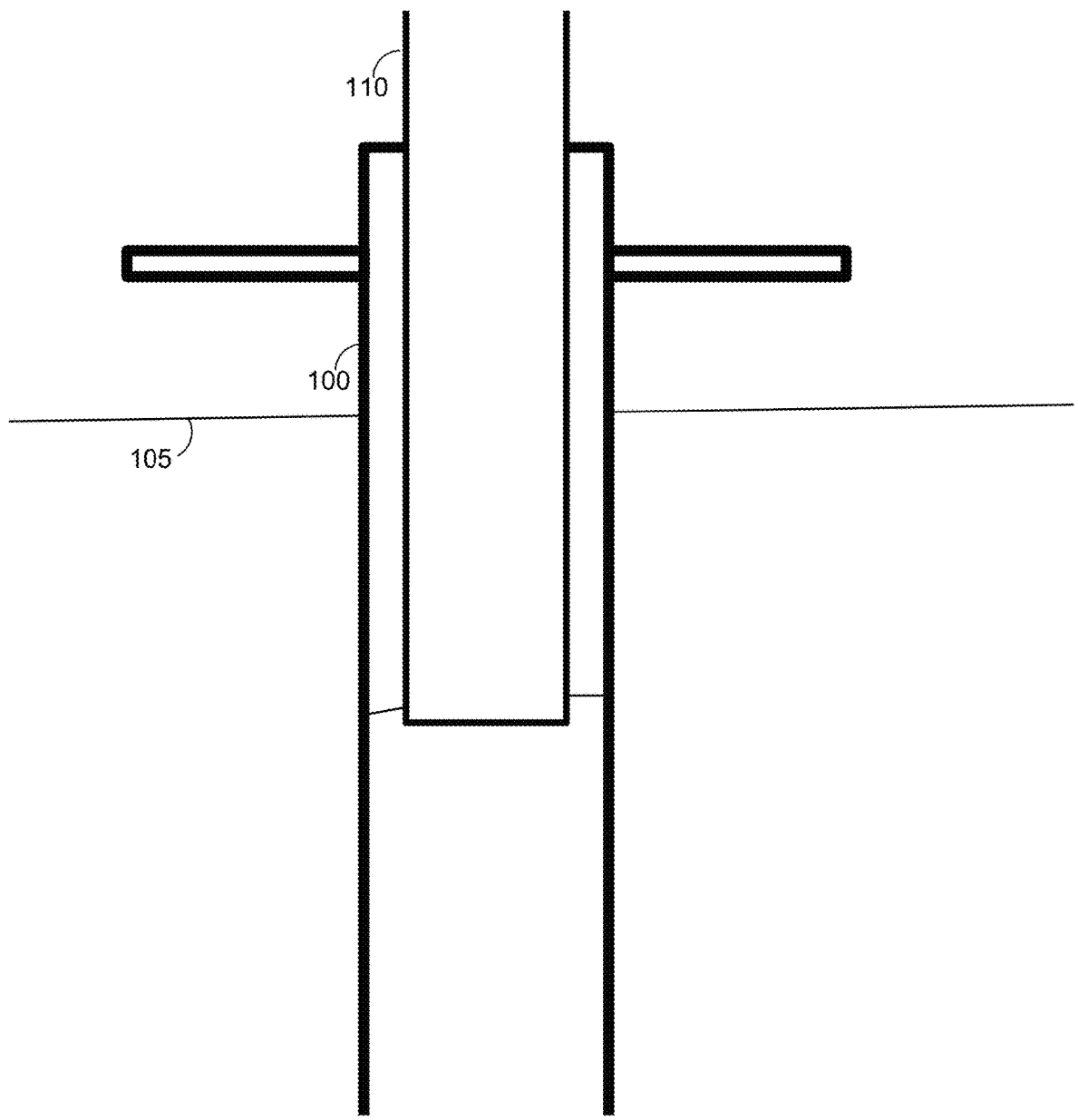
FIG. 1 illustrates an example sand anchor inserted in sand for securing a rod according to embodiments of this disclosure.

FIG. 1 illustrates an example sand anchor 100 inserted in sand 105 for securing a rod 110 according to embodiments of this disclosure. The embodiment of the sand anchor 100 illustrated in FIG. 1 is for illustration only. FIG. 1 does not limit the scope of this disclosure to any particular implementation of the sand anchor.

As shown in FIG. 1, the sand anchor 100 can be inserted into sand 105. The sand anchor 100 uses air pressure to draw sand 105 into the inside of the sand anchor 100. Drawing the sand 105 allows for the walls of the sand anchor 100 to insert into the surrounding sand 105. The sand anchor 100 is typically used in wet sand 105, however, the sand anchor 100 is not limited to this use and can be utilized in any type of material that can be moved by an air flow.

After the sand anchor 100 is inserted to a suitable level, the sand anchor 100 is secured. A depth of sand suitable for securing the sand anchor 100 can be anywhere from approximately six inches to 95% of a length for the sand anchor 100. A level of sand 105 inside of the sand anchor 100 is illustrated as being lower than the sand 105 outside of the sand anchor 100 but the sand 105 can be at equal level or the sand 105 inside of the sand anchor 100 could be higher than the sand 105 outside of the sand anchor 100.

Once the sand anchor 100 is secured in the sand 105, a rod 110 can be inserted into the center of the sand anchor 100. The rod 110 can be inserted to rest on the sand 105 inside of the sand anchor 100 or on a ledge inside of the sand anchor 100. While illustrated and described as a rod 110, the rod 110 can be any type of support that would fit inside of the sand anchor 100. For example, the sand anchor 100 could be inserted in sand at a beach and the rod 110 could be a fishing rod, a tent pole, table stand, etc. In certain embodiments, the sand anchor 100 could be used to anchor a lease for a pet or a tether for a child swimming, where the lease or tether could be tied around the sand anchor 100.

Although FIG. 1 illustrates one example of sand anchor 100, various changes may be made to FIG. 1. For example, the components of the sand anchor are for illustration only.

Figure 2:
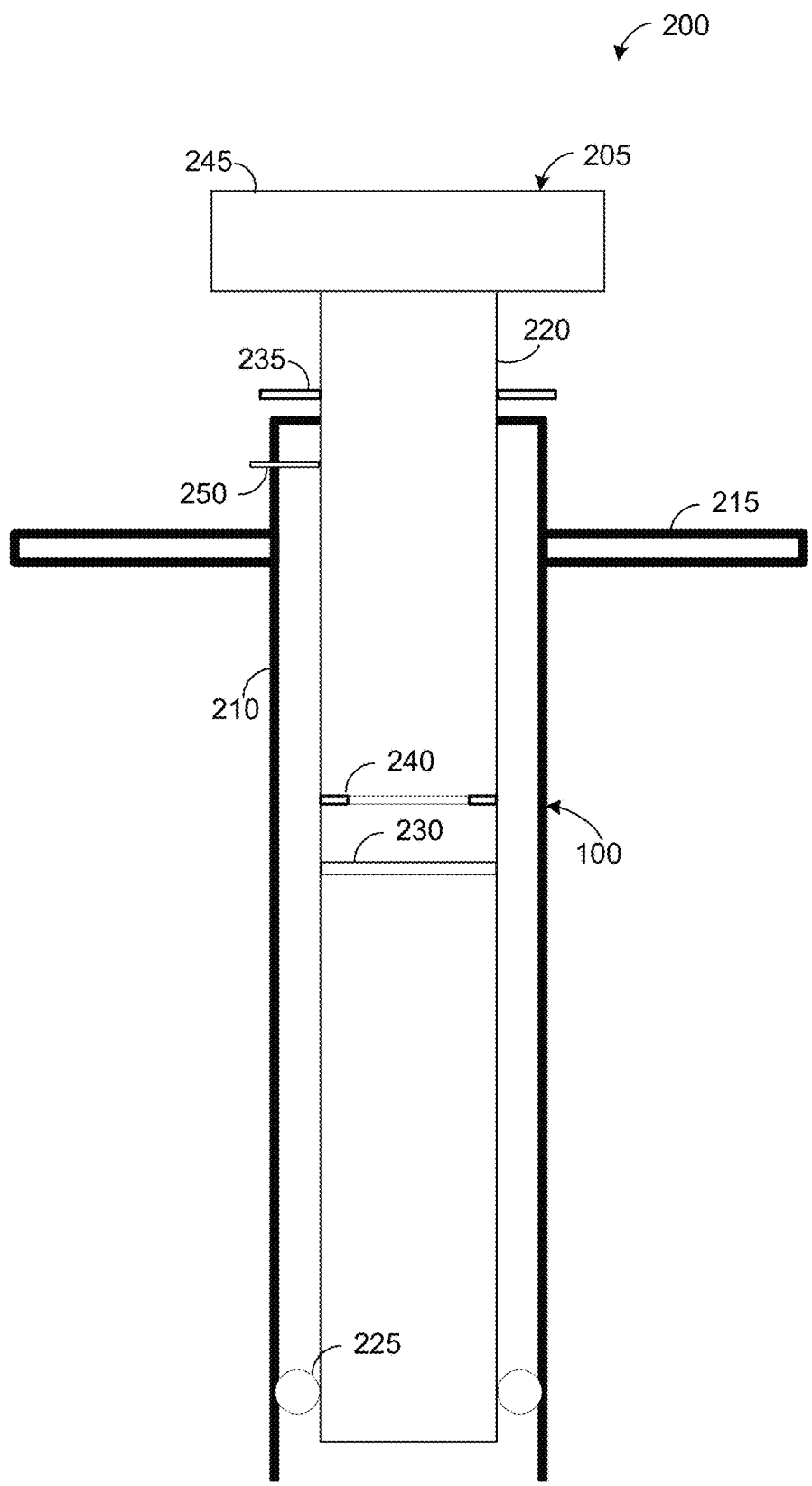
FIG. 2 illustrates an example sand anchor assembly according to embodiments of this disclosure.

FIG. 2 illustrates an example sand anchor assembly 200 according to embodiments of this disclosure. The embodiment of the sand anchor assembly 200 illustrated in FIG. 2 is for illustration only. FIG. 2 does not limit the scope of this disclosure to any particular implementation of the sand anchor assembly.

As shown in FIG. 2, sand anchor assembly 200 can be embed the sand anchor 100 in the sand 105 in order to create a support for holding a rod 110 upright. The sand anchor assembly 200 can include a sand anchor 100 and a plunger 205. The plunger 205 is inserted into a first end of the sand anchor 100. The plunger 205 can be fully inserted prior to placing a second end of the sand anchor 100 on a top surface of the sand 105. A pocket of air is trapped between a bottom of the plunger 205 and top surface of the sand 105. As the plunger 205 is withdrawn from the sand anchor 100, a volume for the pocket of air remains unchanged. In order for the volume to remain unchanged sand is suctioned into the center of the sand anchor 100. As sand 105 is suctioned into the center of the sand anchor 100, the sand anchor 100 descends into the sand 105 to a suitable depth for supporting a rod 110. The sand anchor 100 can include a shank 210 and a cross-grip 215.

The shank 210 is a hollow cylinder that can be inserted into sand. The shank 210 can be made of a plastic material, such as PVC. The shank 210 can be open at both ends. The shank can have protrusions on an inside for aligning the plunger 205. The shank 210 can be formed of a rigid body.

The cross-grip 215 is attached to or integrally formed to an outside of the shank 210. The cross-grip 215 can be used to stabilize the sand anchor 100 or remove the sand anchor 100 after use. One or more cross-grips 215 can be applied in multiple directions for ease of use. The cross-grip 215 can be foldable to reduce a profile of the sand anchor 100. The cross-grip 215 can be removably coupled to the shank 210. The cross-grip 215 can be formed of a similar material or a different material from the shank.

The plunger 205 can be inserted into the shank 210. Before a second end of the shank 210 is placed against sand 105, the plunger 205 can be fully or substantially inserted into the shank 210. Once the second end of the shank 210 is placed in the sand creating an air pocked between an insertion end of the plunger 205 and the sand 105 inside of the shank 210, the plunger 205 can be partially or fully removed from the shank 210. The removal of the plunger 205 causes sand to be suctioned into the inside of the shank 210. As the plunger 205 is suctioning the sand 105, a downward force can be externally applied to the shank 210, such as a downward force on one or more of the cross-grips 215 to cause the shank 210 to be inserted into the sand.

In certain embodiments, the plunger 205 can be fully removed from the shank 210, providing on opening for a rod 110 to be inserted and secured. In certain embodiments, the plunger 205 can remain partially inserted and have accommodations for the rod 110 to be inserted into an inside of the plunger 205. The plunger 205 can include an extension 220, an annular fitting 225, an interior seal 230, a stopper 235, a ledge 240, and a cap 245.

The extension 220 is formed with a hollow center. The extension 220 can be a rod that is shaped corresponding to a first end or top side of the shank 210. The extension 220 can be structured as hollow with an opening at the top and bottom. The extension 220 can be formed of a rigid material similar to the shank 210. In certain embodiments, the extension 220 can be formed of a different material.

The annular fitting 225 can be a fitting around an outer surface of the extension 220. The annular fitting 225 can be formed as a seal for a space between an outer surface of the extension 220 and an inner surface of the shank 210. The annular fitting 225 can be formed of a material that can withstand abrasion from sand while maintaining the air pocket. The annular fitting 225 can be positioned at a distance from an end of the extension 220 inserted into the shank 210 that is less than three times a width of the annular fitting in a direction of an axis of the hollow cylinder.

In embodiments where the plunger 205 is not removed from the sand anchor 100, the annular fitting 225 can provide a limit for the movement of the plunger 205 to not be removed from the shank 210. A protrusion on an inner surface of the shank 210 can limit movement of the annular fitting 225 to maintain the plunger 205 inside of the sand anchor 100.

The interior seal 230 can be a one-way seal located on the interior of the plunger 205. The interior seal 230 allows air flow through when the plunger 205 is pushed down but restricts air flow when the plunger 205 is pulled up in relation to the sand anchor 100. The interior seal 230 allow for multiple pumps of the plunger 205 inside of the sand anchor 100 for any imperfections in the sealing of the air pocket to accommodate for air that escapes. A pump refers to the moving the plunger 205 in relation to the shank 210 in an upward motion and then a downward motion or in a downward motion and an upward motion. The interior seal 230 can be positioned at a distance from an end of the extension 220 inserted into the shank 210 that is greater than half a distance of the extension 220.

The stopper 235 is coupled around a top portion of the extension 220. When the plunger 205 is pushed with too much force or for too long, the stopper 235 can contact a top portion of the shank 210 and limit movement of the plunger 205. The stopper 235 does not allow the plunger 205 to be fully inserted into the shank 210.

The ledge 240 is located above the interior seal 230 inside of the plunger 205. The inside ledge 240 protect the interior seal 230 from object being inserted into the plunger. For example, after the sand anchor 100 is inserted into the sand, a fishing rod can be inserted at the top of the plunger and rests on the inside ledge 240. Without the inside ledge 240, the fishing rod could damage the interior seal 230.

The cap 245 can be coupled to a top side of the extension 220. The cap 245 can provide an extra gripping surface or handle for the plunger 205. The cap 245 can be removably coupled to the extension 220 in a manner that the cap 245 can be removed to allow the rod 110 to be inserted into the sand anchor 100. The cap 245 can also include an air passage to allow for the air released from the interior seal 230 to escape the extension 220. The cap 245 can include a hole corresponding to the hollow portion of the extension 220 to accommodate the rod 110 without removal of the cap 245.

A rod lock 250 can be used to secure a rod 110 that is inserted into the shank 210. The rod lock 250 can extend through the shank 210 into the rod 110. For example, the rod lock 250 can be a screw or bolt. The rod lock 250 can press a rod 110 inserted into the shank 210 against an outer surface of the rod 110. In embodiments where the rod 110 is inserted into the plunger 205, the rod lock 250 can be inserted into the extension 220. The rod lock 250 can be inserted into the extension 220 through the shank 210 or above the shank 210.

Although FIG. 2 illustrates one example of sand anchor assembly 200, various changes may be made to FIG. 2. For example, the components of the sand anchor assembly are for illustration only.

Figure 3A:
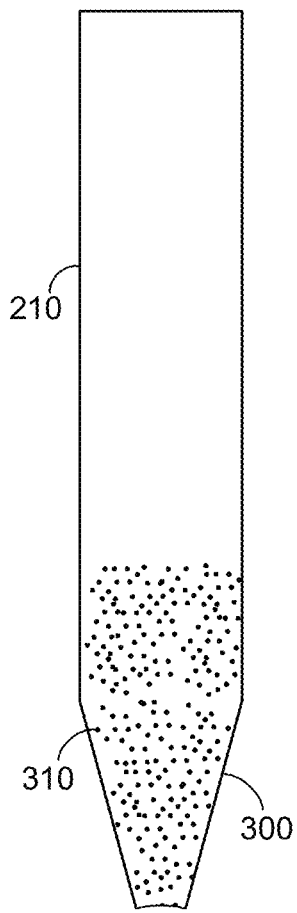
FIGS. 3A and 3B illustrate example tips of the sand anchor according to embodiments of this disclosure.
Figure 3B:
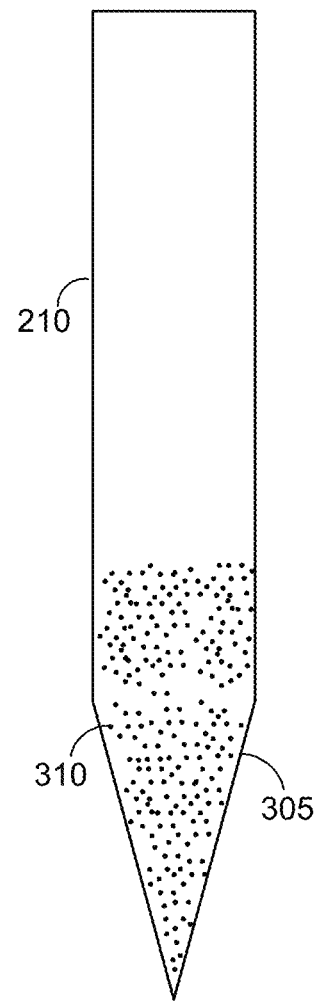

FIGS. 3A and 3B illustrate example tips 300 and 305 of the sand anchor 100 according to embodiments of this disclosure. In particular, FIG. 3A illustrates a partial tip 300 and FIG. 3B illustrates a full tip 305. The embodiment of the partial tip 300 and full tip 305 illustrated in FIGS. 3A and 3B are for illustration only. FIGS. 3A and 3B do not limit the scope of this disclosure to any particular implementation of sand anchor.

As shown in FIG. 3A, a partial tip 300 can extend from an end of the shank 210 to be inserted into sand. A diameter of the partial tip 300 is reduced to a point at an end of the shank 210. The reduction of the diameter of the partial tip 300 can have a continuous transition, segmented transition, or a variable transition. For example, the transition from a smallest diameter can have a greater slope than the portion of the partial tip 300 with a larger diameter closer to the body of the shank 210. An end of the partial tip 300 can be opened or closed. The reduced diameter of the partial tip 300 allows for easy insertion into the sand.

As shown in FIG. 3B, a full tip 305 can extend from an end of the shank 210 to be inserted into sand. A diameter of the full tip 305 is reduced to a point at an end of the shank 210. The reduction of the diameter of the full tip 305 can have a continuous transition, segmented transition, or a variable transition. For example, the transition from a smallest diameter can have a greater slope than the portion of the full tip 305 with a larger diameter closer to the body of the shank 210. The reduced diameter of the full tip 305 allows for easy insertion into the sand.

As shown in FIGS. 3A and 3B, the plurality of holes 310 are formed at a bottom portion of the shank 210 through an end of the partial tip 300. The plurality of holes 310 allows compressed air from the air pocket to escape and draws in sand from the outside of the shank 210 and compress sand outside of the shank 210. The size of the holes 310 can be based on a size of a grain of sand. For example, a diameter of a particle of sand can be in a range from 0.0625 mm up to 2 mm. The size of the holes 310 can be greater than 2 mm to allow particles of sand to flow through the holes 310.

Although FIGS. 3A and 3B illustrate examples of tips 300 and 305, various changes may be made to FIGS. 3A and 3B. For example, the components of the sand anchor assembly are for illustration only.

Figure 4:
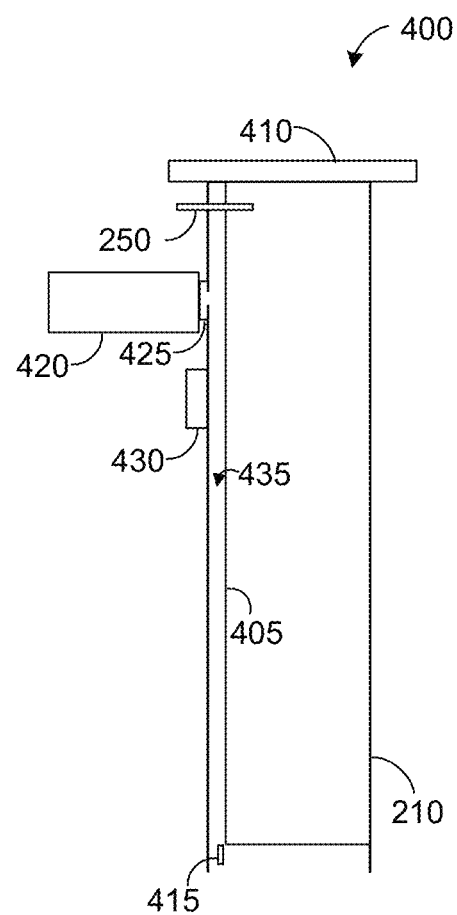
FIG. 4 illustrates an example sand anchor using forced compressed gas according to embodiments of this disclosure.

FIG. 4 illustrates an example sand anchor 400 according to embodiments of this disclosure. The embodiment of the sand anchor 400 illustrated in FIG. 4 is for illustration only. FIG. 4 does not limit the scope of this disclosure to any particular implementation of sand anchor.

Sand anchor 400 is embedded in the sand and is hollow for insertion of a rod 110 to be secured. Sand anchor 400 can include a shank 210, a rod holder 405, a removeable cap 410, compressed gas valve 415, external compressed gas storage 420, external gas valve 425, a compressed gas release 430, and a rod lock 250.

The shank 210 is the body of the sand anchor 400. The shank 210 is preferably a hollow cylinder but can be any hollowed shape. The shank 210 can be made of a sturdy material such metal or hard plastic. The shank 210 is a single piece extending from one foot to six feet, but preferably three feet to four feet.

The rod holder 405 can separate a rod 110 to be secured from the volume of the shank 210 that draws sand or that has gas released. The rod holder 405 can provide for a space to insert a rod, such as an umbrella rod or fishing rod, into the sand anchor 400. The rod holder 405 can be a hollow cylinder shape that is open at a top end and closed at a bottom end. While the rod holder 405 is described as a hollow cylinder, any shape could be used. The shape of the rod holder 405 can be different from the shape of the shank 210. The rod holder 405 can be made of a same material as the shank 210 or a different material. The interior surface of the rod holder 250 can have different surface treatments to provide extra friction for ensuring a rod will remain in the rod holder 250. The rod lock 250 can extend a specific distance into the shank 210, for example, twelve to sixteen inches or be a relative distance, for example, a quarter to a half the length of the shank 210.

The cap 410 covers a top of the shank 210 and the rod holder 405. The cap 410 allows the compressed gas to escape through the holes 310 instead of out a top of the shank 210. The cap 410 can be removed after the shank 210 is buried in the sand to allow access to the rod holder 405. In certain embodiments, the cap 245 can be multiple parts where a removeable portion can cover the rod holder 405 and a fixed portion cover an area between the outside surface of the rod holder 405 and an inside surface of the shank 210. In certain embodiments, the cap 410 can be fixed over an area between the outside surface of the rod holder 405 and an inside surface of the shank 210.

The rod lock 250 is used to secure a rod that is inserted into the rod holder 405. The rod lock 250 can extend through the shank 210 into the rod holder 405. For example, the rod lock 250 can be a screw or bolt. The rod lock 250 can press a rod inserted into the rod holder 405 against an inner surface of the rod holder 405.

The external compressed gas storage 420 can be permanently connected or removably connected through a compressed gas valve 415. The external compressed gas storage 420 stores compressed air, $CO^2$, or any other compressed gas for blowing out the holes to draw sand into the shank 210 or compress sand outside of the shank 210.

The external gas valve 425 is located on an outer surface of the shank 210. The external gas valve 425 can regulate flow of the compressed gas from the external compressed gas storage 420 into the shank 210. The external gas valve 425 can be integral to the external compressed gas storage 420 or a connection point for the external compressed gas storage 420.

The sand anchor 400 can also include an annular path 435 for the compressed gas to be blown towards the plurality of holes 310 or an opening of the shank 210. The annular path 435 is a space between the inside surface of the shank 210 and an outside surface of the rod holder 405. The annular path 435 guides the compressed gas from the external gas valve 425 to the plurality of holes 310 or an opening in the shank 210.

The annular path 435 can also function as an internal compressed gas storage. The internal compressed gas storage can store compressed gas, $CO^2$, or any other compressed gas for blowing out the holes to draw sand into the shank 210 and compresses sand outside of the shank 210.

The valve 415 can release air from the annular path 435 into air pocket of the shank 210 towards the plurality of holes 310 located in the tips 300 and 305 or an opening of the shank 210. The valve 415 regulates an amount of compressed gas released from the annular path 435. The valve 415 can be located at a lower portion of the annular path 435. The location of the valve 415 controls a level of the sand that fills into the shank 210.

Although FIG. 4 illustrates one example of sand anchor 400, various changes may be made to FIG. 4. For example, the components of the sand anchor are for illustration only.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art, including various combinations of the features of different embodiments. Accordingly, the above description of example embodiments does not define or constrain this disclosure. Other changes, substitutions, and alterations are also possible without departing from the spirit and scope of this disclosure, as defined by the following claims.

What is claimed is:

1. A sand anchor comprising:
   a shank; and
   a plunger inserted into a first end of the shank, wherein the plunger includes:
   an extension formed with a hollow center,
   an annular fitting positioned between an outer surface of the extension and an inner surface of the shank,
   an interior seal fixed within the hollow center of the extension at a first length from an end of the extension that is inserted into the shank and configured to provide a one-way seal,
   a ledge fixed within the hollow center of the extension on an opposite side of the interior seal from the end of the extension that is inserted into the shank, wherein the ledge is positioned within the hollow center of the extension a second length from a second end of the extension that is opposite to the end of the extension that is inserted into the shank; and
   wherein the shank further comprises: one or more cross-grips protruding from an exterior surface of the shank, and a second end that is opposite to the first end of the shank, wherein the second end includes a plurality of holes.

2. The sand anchor of claim 1, wherein the interior seal is configured to allow air flow through an interior of the extension when the extension is pushed down relative to the shank and to restrict air flow when the extension is pulled up relative to the shank.

3. The sand anchor of claim 1, wherein the annular fitting is positioned at a third length from the end of the extension that is inserted into the shank that is less than three times a width of the annular fitting in a direction of an axis of the hollow center.

4. The sand anchor of claim 1, wherein the first length that the interior seal is positioned from the end of the extension that is inserted into the shank is greater than half an overall length of the extension.

5. The sand anchor of claim 1, wherein the plunger further includes a stopper coupled around the outer surface of the extension and configured to contact a top portion of the shank to limit a movement of the plunger.

6. The sand anchor of claim 1, wherein the second end of the shank includes a closed tip.

7. The sand anchor of claim 1, wherein the second end of the shank includes an open tip.

8. The sand anchor of claim 1, further comprising:
   a rod lock inserted through the shank and configured to secure a rod inserted into the sand anchor.

9. A sand anchor comprising:
   a shank; and
   a plunger inserted into a first end of the shank, wherein the plunger includes:
   an extension formed with a hollow center,
   an annular fitting positioned between an outer surface of the extension and an inner surface of the shank,
   an interior seal fixed within the hollow center of the extension at a first length from an end of the extension that is inserted into the shank and configured to provide a one-way seal,
   a ledge fixed within the hollow center of the extension on an opposite side of the interior seal from the end of the extension that is inserted into the shank, wherein the ledge is positioned within the hollow center of the extension a second length from a second end of the extension that is opposite to the end of the extension that is inserted into the shank,
   a cap positioned on an end of the extension opposite to an end of the extension inserted into the shank; and
   wherein the shank further comprises: one or more cross-grips protruding from an exterior surface of the shank, and a second end that is opposite to the first end of the shank, wherein the second end includes a plurality of holes.

10. The sand anchor of claim 9, wherein interior seal is configured to allow air flow through an interior of the extension when the extension is pushed down relative to the shank and to restrict air flow when the extension is pulled up relative to the shank.

11. The sand anchor of claim 9, wherein the annular fitting is positioned at a third length from the end of the extension that is inserted into the shank that is less than three times a width of the annular fitting in a direction of an axis of the hollow center.

12. The sand anchor of claim 9, wherein the first length that the interior seal is positioned from the end of the extension that is inserted into the shank is greater than half an overall length of the extension.

13. The sand anchor of claim 9, wherein the plunger further includes a stopper coupled around the outer surface of the extension and configured to contact a top portion of the shank to limit a movement of the plunger.

14. The sand anchor of claim 9, wherein the second end of the shank includes a closed tip.

15. The sand anchor of claim 9, wherein the second end of the shank includes an open tip.

16. The sand anchor of claim 9, further comprising:
   a rod lock inserted through the shank and configured to secure a rod inserted into the sand anchor.

* * * * *